(12) United States Patent
Okita

(10) Patent No.: US 11,841,070 B2
(45) Date of Patent: Dec. 12, 2023

(54) DIFFERENTIAL TRANSMISSION APPARATUS

(71) Applicant: AISIN CORPORATION, Aichi (JP)

(72) Inventor: Sou Okita, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/637,322

(22) PCT Filed: Mar. 30, 2021

(86) PCT No.: PCT/JP2021/013591
§ 371 (c)(1),
(2) Date: Feb. 22, 2022

(87) PCT Pub. No.: WO2021/200979
PCT Pub. Date: Oct. 7, 2021

(65) Prior Publication Data
US 2022/0275856 A1    Sep. 1, 2022

(30) Foreign Application Priority Data

Mar. 30, 2020   (JP) .................................. 2020-060707

(51) Int. Cl.
*F16H 48/40* (2012.01)
*F16H 48/08* (2006.01)
(52) U.S. Cl.
CPC ............. *F16H 48/40* (2013.01); *F16H 48/08* (2013.01)
(58) Field of Classification Search
CPC ................ F16H 48/08–2048/087; F16H 48/40
See application file for complete search history.

(56) References Cited

U.S. PATENT DOCUMENTS

2010/0029434 A1    2/2010    Nakajima et al.

FOREIGN PATENT DOCUMENTS

| CN | 111089154 A * | 5/2020 |
| DE | 10 2012 214165 A1 | 2/2014 |
| EP | 3 299 666 A1 | 3/2018 |

(Continued)

OTHER PUBLICATIONS

Jul. 18, 2022 extended Search Report issued in European Patent Application No. 21780013.5.

(Continued)

*Primary Examiner* — Ernesto A Suarez
*Assistant Examiner* — James J Taylor, II
(74) *Attorney, Agent, or Firm* — Oliff PLC

(57) ABSTRACT

A differential transmission apparatus including: a case that is rotatable around rotation axis that has shaft hole; pinion pin that extends parallel to rotation axis; pinion shaft that is supported by case, that has axial end portion passing through shaft hole of the case, and that bears rotation torque around rotation axis from case via axial end portion when axial end portion is in contact with peripheral wall portion of shaft hole in conjunction with a rotation around the rotation axis of the case; a pinion gear that is rotatably supported around the pinion shaft; and a side gear that meshes with the pinion gear, in which on an end surface in an axial direction of the pinion shaft, the pinion shaft has a groove portion that extends in an extending direction of the pinion pin, and in which the pinion pin is fitted into the groove portion.

6 Claims, 6 Drawing Sheets

(56) References Cited

FOREIGN PATENT DOCUMENTS

| | | |
|---|---|---|
| FR | 2 925 137 A1 | 6/2009 |
| JP | S59-131648 U | 9/1984 |
| JP | 2010-038223 A | 2/2010 |
| JP | 2012-137113 A | 7/2012 |
| WO | WO-2007085847 A1 * | 8/2007 ............. F16H 48/08 |

OTHER PUBLICATIONS

May 25, 2021 Search Report issued in International Patent Application No. PCT/JP2021/013591.

* cited by examiner

DIFFERENTIAL TRANSMISSION APPARATUS

TECHNICAL FIELD

The present disclosure relates to a differential transmission apparatus.

BACKGROUND ART

A configuration is known in which a torque transmission portion between a pinion gear and a differential case is formed on a radially outer side of the pinion gear in the radial direction around a rotation axis of a case (differential case) according to a differential transmission apparatus, and in which a pinion pin is disposed on an end surface of a pinion shaft.

RELATED ART DOCUMENTS

Patent Documents

Patent Document 1: Japanese Unexamined Patent Application Publication No. 2010-38223 (JP 2010-38223 A)

SUMMARY OF THE DISCLOSURE

Problem to be Solved by the Disclosure

In the above-mentioned conventional technique, since diameter of the pinion gear is increased by just an amount of the torque transmission portion, there is a problem that the diameter of the differential case is suppressed from being reduced.

Thus, on one aspect, an object of the present disclosure is to reduce the diameter of the case according to the differential transmission apparatus.

Means for Solving the Problem

According to an aspect of the present disclosure, provided is a differential transmission apparatus including:
  a case that is rotatable around a rotation axis and that has a shaft hole;
  a pinion pin that extends parallel to the rotation axis;
  a pinion shaft that is supported by the case, that has an axial end portion passing through the shaft hole of the case, and that bears a rotation torque around the rotation axis from the case via the axial end portion when the axial end portion is in contact with a peripheral wall portion of the shaft hole in conjunction with a rotation around the rotation axis of the case;
  a pinion gear that is rotatably supported around the pinion shaft; and
  a side gear that meshes with the pinion gear,
  in which on an end surface in an axial direction of the pinion shaft, the pinion shaft has a groove portion that extends in an extending direction of the pinion pin, and in which the pinion pin is fitted into the groove portion.

Effects of the Disclosure

According to the present disclosure, it is possible to reduce the diameter of the case according to the differential transmission apparatus.

MODES FOR CARRYING OUT THE DISCLOSURE

Hereinafter, each embodiment will be described in detail with reference to the accompanying drawings.

Figure 1:
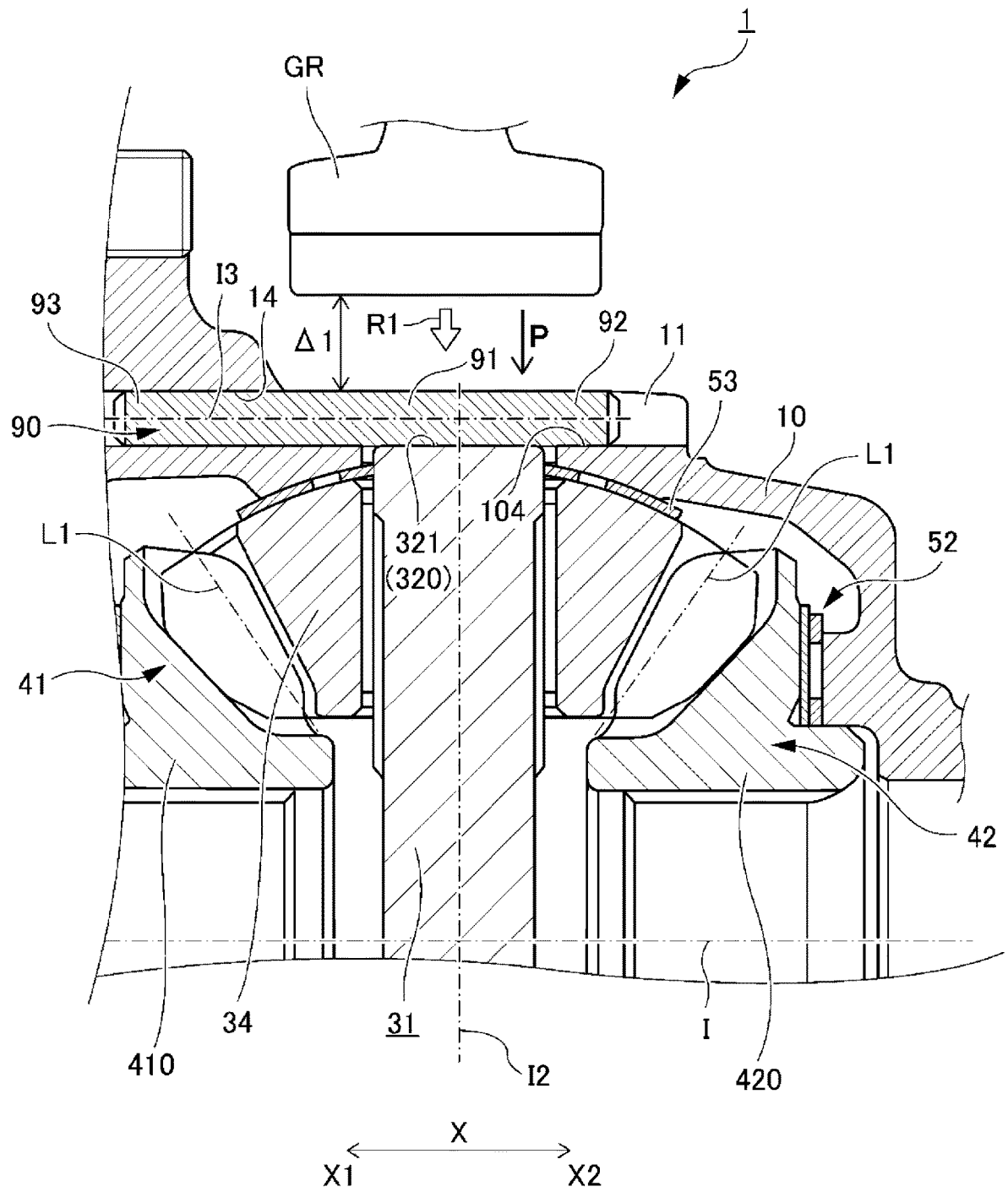
FIG. 1 is a sectional view showing a part of a differential transmission apparatus according to an embodiment.
Figure 2:
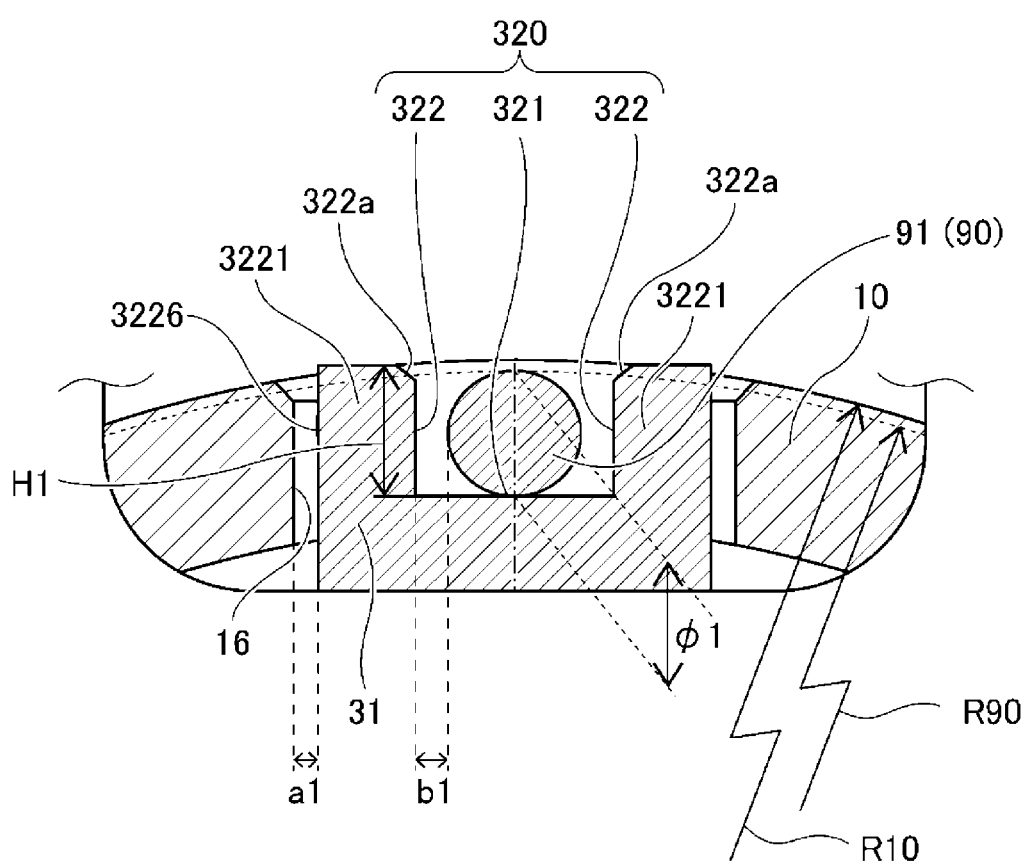
FIG. 2 is a sectional view taken through a center line I2 of a pinion shaft.
Figure 3:
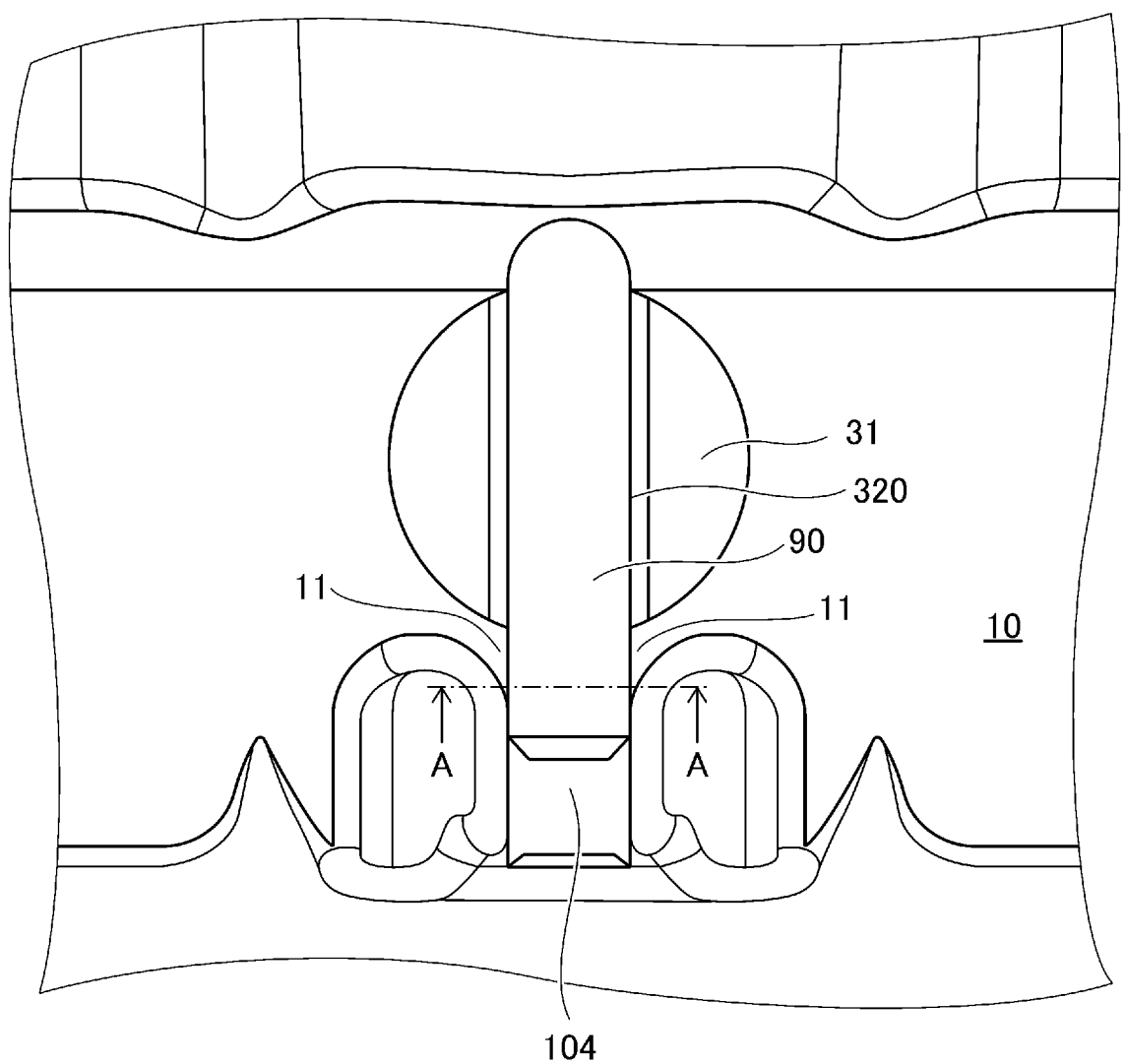
FIG. 3 is a plan view seen in the direction of an arrow P in FIG. 1.
Figure 4:
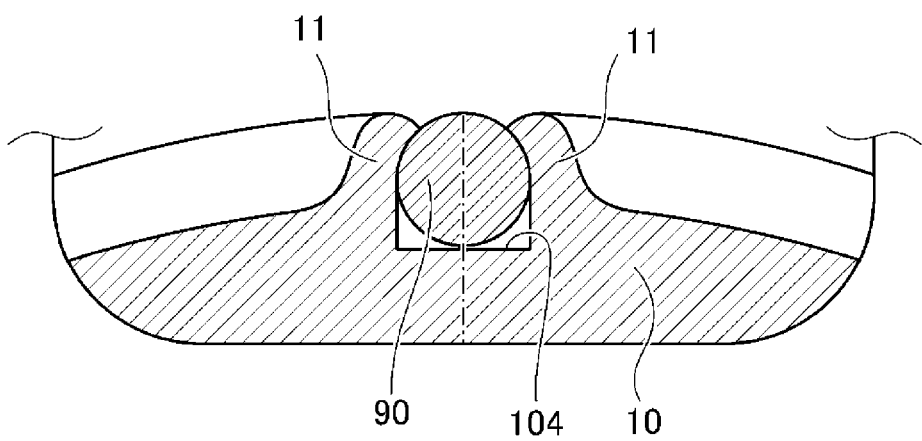
FIG. 4 is a sectional view taken along a line A-A of FIG. 3.
Figure 5:
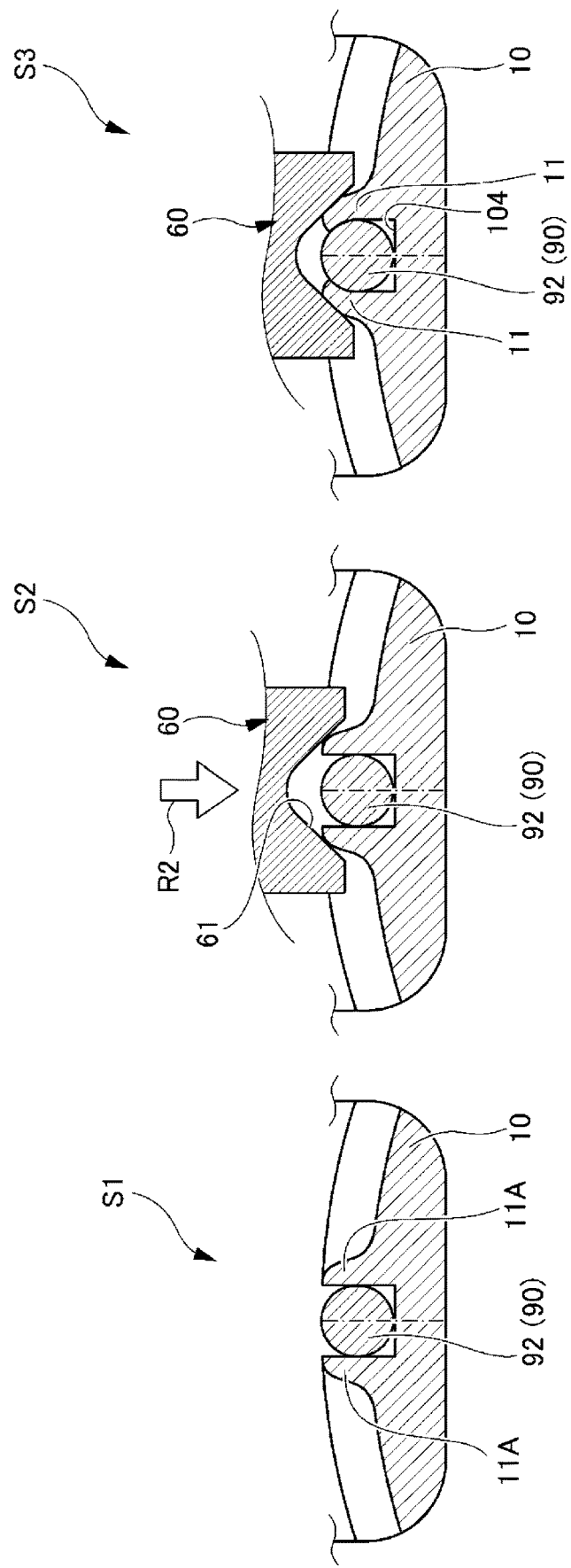
FIG. 5 is an explanatory diagram of a swaging method.

FIG. 1 is a sectional view showing a part of a differential transmission apparatus 1 according to an embodiment. FIG. 2 is a sectional view taken through a center line I2 of a pinion shaft 31. FIG. 3 is a plan view seen in the direction of an arrow P in FIG. 1. FIG. 4 is a sectional view taken along a line A-A of FIG. 3. FIG. 5 is an explanatory diagram of a swaging method. In addition, in FIG. 1 and the like, for making the figures easy to see, reference symbols may be given only to a part of a plurality of parts having the same attribute.

FIG. 1 shows a center line I along an axial direction of an axle. In the following, unless otherwise specified, an axial direction refers to a direction along the center line I, a radial direction refers to a radial direction from the center line I, a circumferential direction refers to a circumferential direction around the center line I, and the term "around the axis" refers to around the center line I. Further, an axial outer side refers to a side of the pinion shaft 31 away from a center line I2. A radially outer side refers to a side away from the center line I. Further, in FIG. 1, an X1 side and an X2 side are defined in an X direction parallel to the axial direction. The X direction corresponds to a vehicle width direction.

Note that FIG. 1 shows only one side (one side in the radial direction) of the configuration on both sides of the differential transmission apparatus 1 in the radial direction. The configuration on both sides of the differential transmission apparatus 1 in the radial direction is substantially symmetrical with respect to the center line I.

The differential transmission apparatus 1 forms a part of a vehicle drive device (the entirety is not shown and the same applies hereinafter), and is connected to an output shaft of the vehicle drive device. The details of the vehicle drive device may be arbitrary, including a power source such as an electric motor or an engine, and is simply required to be a configuration that can transmit rotational torque to the differential transmission apparatus 1.

The differential transmission apparatus 1 transmits the rotational torque transmitted from the output shaft of the vehicle drive device to wheels (not shown) via an axle member (not shown) such as a drive shaft. The differential transmission apparatus 1 is rotatably supported around an axis with respect to the vehicle body side (not shown). The differential transmission apparatus 1 includes a differential case 10, the pinion shaft 31, a pinion gear 34, a first side gear 41, a second side gear 42, and a pinion pin 90.

The differential case 10 forms an internal space in which the pinion shaft 31, the pinion gear 34, the first side gear 41, the second side gear 42, and the like are arranged. The differential case 10 extends in a region overlapping the first side gear 41 and the second side gear 42 when viewed in the axial direction. That is, the differential case 10 covers the first side gear 41 and the second side gear 42 in the axial direction. The differential case 10 does not need to cover the entire first side gear 41 and the second side gear 42 in the axial direction, and only needs to cover the first side gear 41 and the second side gear 42 in such a manner that a load bearing function described later is ensured. Further, the differential case 10 may be formed of two or more members.

The differential case 10 has a function of bearing a load from the first side gear 41 and the second side gear 42 to the axial outer side (load bearing function). FIG. 1 shows a state in which the differential case 10 rotatably supports the second side gear 42 via a washer 52. In this case, the differential case 10 bears a load from the second side gear 42 to the axial outer side via the washer 52. The relationship between the differential case 10 and the second side gear 42 is the same as the relationship between the differential case 10 and the first side gear 41.

The differential case 10 has a form in which an axle member (not shown) on the X1 side passes through on a radially inner side, on the X direction X1 side, and is connected to the output shaft of the vehicle drive device. When the output shaft of the vehicle drive device rotates, the differential case 10 rotates around the shaft. Further, the differential case 10 has a form in which an axle member (not shown) on the X2 side passes through on the radially inner side, on the X direction X2 side.

The pinion shaft 31 extends through the center line I in a manner orthogonal to the center line I. A pair of the pinion gears 34 is provided at both ends (both ends in the radial direction) of the pinion shaft 31.

In the pinion shaft 31, an end portion 3226 in the axial direction (hereinafter, also referred to as the "axial end portion 3226") forms a torque transmission portion 3221. Specifically, the axial end portion 3226 of the pinion shaft 31 is inserted into a shaft hole 16 of the differential case 10. When the differential case 10 rotates relative to the pinion shaft 31 by just the amount of a clearance a1 between the pinion shaft 31 and a peripheral wall portion of the shaft hole 16 of the differential case 10 in the circumferential direction, the axial end portion 3226 of the pinion shaft 31 is in contact with the peripheral wall portion of the hole 16 of the differential case 10 (accordingly, the torque transmission portion 3221 is formed). In this case, the pinion shaft 31 receives the rotational torque around the shaft from the differential case 10 at the torque transmission portion 3221.

From the viewpoint of enhancing the torque transmission function by the torque transmission portion 3221 of the pinion shaft 31, the pinion shaft 31 is formed so that the contact range (range in the radial direction) with the differential case 10 is maximized. Specifically, the torque transmission function is reduced when the outermost diameter position of the pinion shaft 31 is positioned on the radially inner side of the differential case 10 (see a circle that has the center line I as the center and that outwardly touches the differential case 10, that is a circle with an outer diameter R10) for an excessively longer distance. On the other hand, when the outermost diameter position of the pinion shaft 31 is located on the radially outer side of the differential case 10 for an excessively longer distance, the pinion shaft 31 hinders the reduction of the diameter of the differential transmission apparatus 1. Thus, the outermost diameter position of the pinion shaft 31 is preferably located at a position on or slightly offset from the circle (see outer diameter R10) that has the center line I as the center and that outwardly touches the differential case 10. Hereinafter, such a preferable configuration is referred to as "a configuration in which the outermost diameter position of the pinion shaft 31 corresponds to the outer diameter of the differential case 10".

On the radially outer side of the pinion gear 34, a pinion pin 90 is provided at both ends (both ends in the radial direction) of the pinion shaft 31. Specifically, as shown in FIG. 2, the pinion shaft 31 has a groove portion 320 at an end surface (end surface in the radial direction), and the pinion pin 90 is fitted into the groove portion 320. The pinion pin 90 has a function of regulating the displacement of the pinion shaft 31 in the axial direction.

The groove portion 320 extends in parallel with the axial direction in a manner orthogonal to the center line I2. The groove portion 320 has a bottom surface 321 and side wall surfaces 322, and the pinion pin 90 comes into contact (for example, line contact) with the bottom surface 321. A slight clearance may be set between the pinion pin 90 and the bottom surface 321 in a normal positional relationship (positional relationship when a tolerance is not included).

When the outermost diameter position of the pinion shaft 31 corresponds to the outer diameter of the differential case 10 as described above, the groove portion 320 is provided adjacent to the torque transmission portion 3221 in the circumferential direction. In this case, the greater a depth H1 of the groove portion 320 is, the more disadvantageous the strength of the torque transmission portion 3221 of the pinion shaft 31 becomes. This is because a length of the torque transmission portion 3221 having a cantilever structure due to the groove portion 320 (a length of a beam according to the torque transmission portion 3221 in the cantilever structure on each side in the circumferential direction) in the radial direction becomes large. On the other hand, when the depth H1 of the groove portion 320 is excessively small, the pinion pin 90 does not completely fit in the groove portion 320 and extends to the radially outer side. In this case, the pinion pin 90 hinders the reduction in diameter of the differential transmission apparatus 1. When the depth H1 of the groove portion 320 is significantly smaller than a diameter φ1 of the pinion pin 90 and the outermost diameter position of the pinion pin 90 is positioned on the radially inner side of the differential case 10 for an excessively longer distance (for example, a distance of φ1 or more in diameter) (that is, when the configuration is not such that the outermost diameter position of the pinion shaft 31 corresponds to the outer diameter of the differential case 10), although the pinion pin 90 does not hinder the reduction in diameter of the differential transmission apparatus 1, the torque transmission function of the torque transmission portion 3221 tends to be insufficient, as described above.

In consideration of such a point, the depth H1 of the groove portion 320 preferably corresponds to the diameter φ1 of the pinion pin 90. For example, in FIG. 2, the groove portion 320 may have chamfered portions 322a on inlet sides (radially outer sides) of the side wall surfaces 322, and the depth H1 to the chamfered portions 322a may coincide with the diameter φ1.

Each of the pair of pinion gears 34 is rotatably provided around the pinion shaft 31. Each of the pair of pinion gears 34 meshes with the first side gear 41 and the second side gear 42 in the radial direction around the center line I2. In FIG. 1, the pair of pinion gears 34 is in the form of bevel gears, and the meshing with the first side gear 41 and the second side gear 42 is realized by the meshing at a tooth surface (a surface of a tooth tip and a surface of a tooth bottom) inclined with respect to the center line I2 (see line L1 in FIG. 1). However, the pair of pinion gears 34 is not limited to this. The meshing of the pair of pinion gears 34 with the first side gear 41 and the second side gear 42 may be realized by meshing with a tooth surface parallel to the center line I2.

In the present embodiment, each of the pair of pinion gears 34 does not have a part (torque transmission portion) that directly transmits a relatively large rotational torque (rotational torque around the axis) with the differential case 10, unlike the pinion gears described in Patent Document 1. In FIG. 1, in each of the pair of pinion gears 34, a surface (spherical surface) on the radially outer side is slidably supported by the differential case 10 via a washer 53.

The first side gear 41 is provided between the pinion shaft 31 and the differential case 10 in the axial direction. The first side gear 41 meshes with each of the pair of pinion gears 34 on both sides in the radial direction.

The first side gear 41 is connected to the axle member (not shown) on the X1 side on the radially inner side in a manner of integrally rotating with the axle member (not shown) on the X1 side. For example, the first side gear 41 is spline-fitted with the axle member (not shown) on the X1 side. The first side gear 41 has a shaft portion 410 extending on the radially inner side of the pinion gear 34, and the axle member (not shown) is inserted on the radially inner side of the shaft portion 410 in a non-relative-rotatable manner.

The second side gear 42 is provided between the pinion shaft 31 and the differential case 10 in the axial direction. The second side gear 42 meshes with each of the pair of pinion gears 34 on both sides in the radial direction.

The second side gear 42 is connected to the axle member (not shown) on the X2 side on the radially inner side in a manner of integrally rotating with the axle member (not shown) on the X2 side. For example, the second side gear 42 is spline-fitted with the axle member (not shown) on the X2 side. The second side gear 42 has a shaft portion 420 extending on the radially inner side of the pinion gear 34, and the axle member (not shown) is inserted on the radially inner side of the shaft portion 420 in a non-relative-rotatable manner.

The pinion pin 90 extends in the direction of a center line I3. The center line I3 intersects with the center line I2 and is parallel to the axial direction (center line I). The pinion pin 90 is fitted in the groove portion 320 of the end portion of the pinion shaft 31 and fixed to the differential case 10.

Specifically, along the direction of the center line I3, the pinion pin 90 includes a central portion 91 and end portions 92, 93 on both sides of the central portion 91.

As shown in FIG. 2, the pinion pin 90 has the central portion 91 fitted in the groove portion 320 of the pinion shaft 31. The central portion 91 is preferably fitted in a manner having a slight clearance (see clearance b1 described later) with respect to the groove portion 320 in the circumferential direction.

As described above, the central portion 91 fits into the groove portion 320 of the pinion shaft 31. The pinion pin 90 regulates the displacement of the pinion shaft 31 in the axial direction by fitting the central portion 91 into the groove portion 320 of the pinion shaft 31. As described above, the pinion pin 90 is provided on both sides of the pinion shaft 31 in the axial direction. This makes it possible to prevent the pinion shaft 31 from detaching from the differential case 10.

Here, the circumferential clearance b1 (see FIG. 2) (an example of a second clearance) between the central portion 91 and the groove portion 320 of the pinion shaft 31 is preferably significantly larger than the clearance a1 (the clearance a1 of the differential case 10 and the pinion shaft 31 in the circumferential direction) (an example of a first clearance) described above. When the clearance b1 is smaller than the clearance a1, the pinion pin 90 cooperates with the torque transmission portion 3221 of the pinion shaft 31 to realize torque transmission between the differential case 10 and the pinion shaft 31. In this case, a relatively large rotational torque is likely to be applied to the pinion pin 90. On the other hand, by making the clearance b1 significantly larger than the clearance a1, it is possible to prevent the pinion pin 90 from being subjected to a relatively large rotational torque. Specifically, when the differential case 10 rotates relative to the pinion shaft 31 from the normal positional relationship, the pinion shaft 31 comes into contact with the differential case 10 in the circumferential direction at the stage where the differential case 10 rotates relative to the pinion shaft 31 by just the amount of the clearance a1 in the circumferential direction. Thus, the differential case 10 cannot rotate relative to the pinion shaft 31 beyond the clearance a1 and up to the amount of the clearance b1. In this way, it is possible to prevent the pinion pin 90 from being subjected to a relatively large rotational torque. As a result, the strength required for the pinion pin 90 can be reduced.

In the pinion pin 90, the end portion 92 (an example of a first end portion) on the X direction X2 side is swaged to the differential case 10. Specifically, as shown in FIGS. 3 and 4, the differential case 10 has a recess portion 104 extending along the center line I3 in a manner in which the recess portion 104 is continuous with the groove portion 320. The recess portion 104 has a shape in which the radially outer side opens. The pinion pin 90 is fitted in the recess portion 104 and then swaged by the recess portion 104. That is, the end portion 92 is swaged from the radially outer side by a side wall portion 11 of the recess portion 104 in a state of being fitted in the recess portion 104. In this case, even on the X direction X2 side of the pinion pin 90, it is possible to reduce the diameter of the differential case 10 as compared with the case where the end portion 92 on the X direction X2 side is fitted into the pin hole. Further, the end portion 92 on the X direction X2 side can be firmly fixed in the recess portion 104.

FIG. 5 schematically shows a method for realizing such swaging. In FIG. 5, first, the swaging method includes a step (S1) of fitting the pinion pin 90 in the recess portion 104. In this state, the recess portion 104 has side walls 11A (a portion that becomes the side wall portion 11) before swaging. Next, the swaging method includes a step (S2) of moving a swaging jig 60 from the radially outer side to the radially inner side with respect to the recess portion 104 (see an arrow R2) to bring the swaging jig 60 into contact with the side walls 11A. In FIG. 5, the swaging jig 60 has an inclined surface 61 inclined along the outer sides of the side walls 11A (the side away from the pinion pin 90). Then, a step (S3) of plastically deforming the side walls 11A by applying a force in the direction in which the side walls 11A tilt toward the pinion pin 90 by moving the swaging jig 60 to the radially inner side is included. In this way, when the end portion 92 of the pinion pin 90 on the X direction X2 side is swaged to the differential case 10, the end portion 92 of the pinion pin 90 on the X direction X2 side is integrated with the differential case 10.

Further, in the pinion pin 90, the end portion 93 (an example of a second end portion) on the X direction X1 side is inserted (fitted) into a pin hole 14 of the differential case 10. The end portion 93 may be press-fitted into the pin hole 14 or may be fitted in a manner having a slight clearance with respect to the pin hole 14. In this case, both end portions on the outer side of the pinion pin 90 (both end portions on the outer side of the portion fitted in the groove portion 320 in the axial direction of the pinion pin 90) can be fixed to the differential case 10.

In this way, the pinion pin 90 is integrated with the differential case 10 by fixing both end portions in the X direction to the differential case 10. In this case, the pinion pin 90 can be reliably supported at both end portions in the X direction to the differential case 10.

The operation itself of the differential transmission apparatus 1 of the present embodiment is the same as that of a normal differential transmission apparatus. To give an outline, when the resistance applied to the first side gear 41 and the second side gear 42 is the same, the pinion gear 34 revolves around the shaft (axle) without rotating around the pinion shaft 31, and the first side gear 41 and the second side gear 42 rotates at the same rotation speed as the revolution. On the other hand, when the resistance applied to the first side gear 41 and the second side gear 42 is different, the pinion gear 34 revolves while rotating, and the first side gear 41 and the second side gear 42 rotate at different rotation speeds.

Next, the effect of the present embodiment will be described with reference to the comparative example of FIG. 6.

Figure 6:
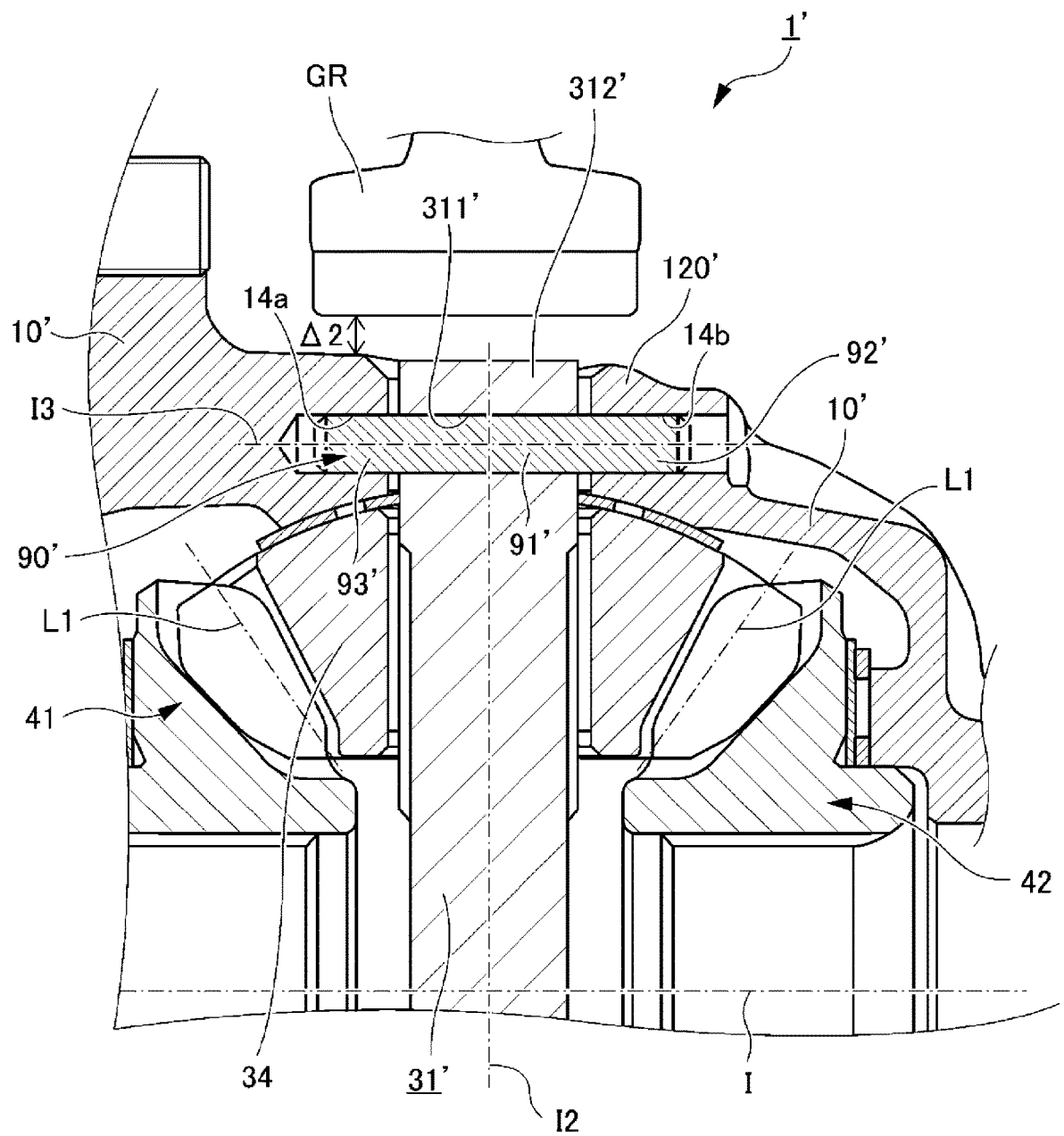
FIG. 6 is a sectional view showing a part of a differential transmission apparatus according to a comparative example.

FIG. 6 is a sectional view showing a differential transmission apparatus 1' according to a comparative example. The differential transmission apparatus 1' according to the comparative example is different from the differential transmission apparatus 1 of the present embodiment in that the differential case 10 is replaced with a differential case 10', the pinion shaft 31 is replaced with a pinion shaft 31', and the pinion pin 90 is replaced with a pinion pin 90'.

In the differential transmission apparatus 1' according to the comparative example, as shown in FIG. 6, in the pinion pin 90', a central portion 91' is passed through a pin hole 311' of the pinion shaft 31', and end portions 92', 93' on both sides are inserted (fitted) in pin holes 14a, 14b of the differential case 10'.

In such a comparative example, the pinion shaft 31' has an end portion 312' on the radially outer side of the pinion pin 90', and the diameter is increased by just the amount of the end portion 312'. That is, the pinion shaft 31' has a longer length in the radial direction. Accordingly, the diameter of the differential case 10' is also increased (the diameter around the center line I is increased) in the portion where the pinion pin 90' is disposed.

However, the pinion shaft 31 according to the present embodiment does not have an end portion 312', unlike the pinion shaft 31' according to the comparative example. That is, as described above, since the pinion shaft 31 has the groove portion 320 into which the pinion pin 90 is fitted, the end portion 312' of the pinion shaft 31' according to the comparative example can be eliminated, and the diameter of the differential case 10 can be reduced by just the amount of the end portion 312'. In this way, according to the present embodiment, the diameter of the differential case 10 can be reduced in the portion where the pinion shaft 31 is disposed.

More specifically, according to the present embodiment, the outer diameter R10 of the circle that has the center line I as the center and that outwardly touches the differential case 10 is substantially the same as an outer diameter R90 of the circle that has the center line I as the center and that outwardly touches the pinion pin 90 on the plane that includes the center line I2 of the pinion shaft 31 and that is perpendicular to the center line I (view of FIG. 2). The term substantially the same is a concept that allows an error of about the radius of the pinion pin 90 or less. In the example shown in FIG. 2, the outer diameter R10 and the outer diameter R90 has a difference corresponding to the difference between the depth H1 of the groove portion 320 and the diameter φ1 of the pinion pin 90 (difference caused by the chamfered portions 322a as described above). Thus, according to the present embodiment, since the differential case 10 can be formed with the minimum outer diameter corresponding to the position of the pinion pin 90 in the radial direction, the diameter of the differential case 10 can be reduced. In the present embodiment, the position of the pinion pin 90 in the radial direction is slightly on the radially outer side of the spherical surface (the surface that is in contact with the washer 53) on the radial outer side of the pinion gear 34.

Further, in the comparative example, the differential case 10' has an outer peripheral portion 120' on the radially outer side of the end portion 92' of the pinion pin 90', and the diameter is increased by just the amount of the outer peripheral portion 120'. Accordingly, the diameter of the differential case 10' is increased (the diameter around the center line I is increased) in the portion where the end portion 92' of the pinion pin 90' is disposed.

In contrast, according to the present embodiment, the differential case 10 does not have the outer peripheral portion 120', unlike the differential case 10' according to the comparative example. That is, as described above, since the differential case 10 holds the end portion 92 of the pinion pin 90 by the recess portion 104, the outer peripheral portion 120' of the differential case 10' according to the comparative example can be eliminated, and it is possible to reduce the diameter of the differential case 10 by just the amount of the outer peripheral portion 120'. In this way, according to the present embodiment, the diameter of the differential case 10 can be reduced even in the portion where the end portion 92 of the pinion pin 90 is disposed.

Thus, when a gear GR is disposed on the radially outer side of the pinion shaft 31, a separation distance (a distance in the radial direction) Δ1 between the differential transmission apparatus 1 and the gear GR can be increased more than a separation distance (a distance in the radial direction) Δ2 between the differential transmission apparatus 1' and the gear GR according to the comparative example. In other words, the separation distance Δ1 between the differential transmission apparatus 1 and the gear GR can be reduced to the separation distance Δ2 (see arrow R1). In this way, the degree of freedom in the layout of peripheral parts around the differential transmission apparatus 1 can be increased. The gear GR is, for example, a counter-driven gear (a gear coaxial with a differential drive gear) that transmits rotational torque to the differential transmission apparatus 1, and may be a counter-driven gear as disclosed in Japanese Unexamined Patent Application Publication No. 2013-023036 (JP 2013-023036 A).

Although each embodiment has been described in detail above, the present disclosure is not limited to the specific embodiments, and various modifications and changes can be made within the scope of the claims. Further, it is possible to combine all or a plurality of the configuration elements of the embodiments described above.

For example, in the above-described embodiment, the pinion shaft 31 is a type that extends over the entire diameter when viewed in the axial direction. However, the pinion shaft 31 may be a type (short type) in which a plurality of pinion shafts (for example, four pinion shafts) extends radially from a radial center side to the radially outer side.

Further, in the above-described embodiment, as a preferred embodiment, the differential case 10 holds the end portion 92 of the pinion pin 90 by swaging by the recess portion 104. However, the end portion 92 of the pinion pin 90 may be held by the pin hole 14b, similar to the comparative example shown in FIG. 6. Even in this case, although the diameter of the differential case 10 cannot be reduced in the portion where the end portion 92 of the pinion pin 90 is disposed, the diameter of the differential case 10 can still be reduced in the portion where the pinion shaft 31 is disposed.

DESCRIPTION OF THE REFERENCE NUMERALS

1 . . . differential transmission apparatus, 10 . . . differential case, 104 . . . recess portion, 11 . . . side wall portion, 14 . . . pin hole, 16 . . . shaft hole, 90 . . . pinion pin, 92 . . . end portion (first end portion), 93 . . . end portion (second end portion), 31 . . . pinion shaft, 320 . . . groove portion, 3226 . . . axial end portion, 34 . . . pinion gear, 41 . . . first side gear (side gear), 42 . . . second side (side gear), l2 . . . center line (rotation axis), a1 . . . clearance (first clearance), b1 . . . clearance (second clearance)

The invention claimed is:

1. A differential transmission apparatus comprising:
a case that is rotatable around a rotation axis and that has a shaft hole;
a pinion pin that extends parallel to the rotation axis;
a pinion shaft that is supported by the case, that has an axial end portion passing through the shaft hole of the case, and that bears a rotation torque around the rotation axis from the case via the axial end portion when the axial end portion is in contact with a peripheral wall portion of the shaft hole in conjunction with a rotation around the rotation axis of the case;
a pinion gear that is rotatably supported around the pinion shaft; and
a side gear that meshes with the pinion gear,
wherein on an end surface in an axial direction of the pinion shaft, the pinion shaft has a groove portion that extends in an extending direction of the pinion pin,
wherein the pinion pin is fitted into the groove portion,
wherein on one side in an axial direction of the pinion pin, the pinion pin includes a first end portion that extends to an outer side of the groove portion,
wherein the case includes a recess portion that extends in an extending direction of the groove portion and that opens to a radially outer side, in a manner in which the recess portion is continuous with the groove portion, and
wherein the first end portion is swaged from the radially outer side by a side wall portion of the recess portion in a state in which the first end portion is fitted in the recess portion.

2. The differential transmission apparatus according to claim 1, wherein on a plane that includes an axis of the pinion shaft and that is perpendicular to the rotation axis, a distance from the rotation axis to an outermost side of the case is substantially the same as a distance from the rotation axis to an outermost side of the pinion pin.

3. The differential transmission apparatus according to claim 2,
wherein the axial end portion of the pinion shaft includes a first clearance with respect to the peripheral wall portion of the shaft hole of the case in a circumferential direction around the rotation axis, and
wherein with respect to the groove portion in the circumferential direction, the pinion pin includes a second clearance that is larger than the first clearance.

4. The differential transmission apparatus according to claim 1,
wherein on the other side in the axial direction of the pinion pin, the pinion pin has a second end portion that extends to the outer side of the groove portion, and
wherein the second end portion is inserted into a pin hole formed in the case.

5. The differential transmission apparatus according to claim 4,
wherein the axial end portion of the pinion shaft includes a first clearance with respect to the peripheral wall portion of the shaft hole of the case in a circumferential direction around the rotation axis, and
wherein with respect to the groove portion in the circumferential direction, the pinion pin includes a second clearance that is larger than the first clearance.

6. The differential transmission apparatus according to claim 1,
wherein the axial end portion of the pinion shaft includes a first clearance with respect to the peripheral wall portion of the shaft hole of the case in a circumferential direction around the rotation axis, and
wherein with respect to the groove portion in the circumferential direction, the pinion pin includes a second clearance that is larger than the first clearance.

* * * * *